March 16, 1954　　J. H. CHANDLER　　2,672,079
ARTICLE HANDLING AND STACKING MACHINE
Filed Feb. 25, 1950　　5 Sheets-Sheet 5
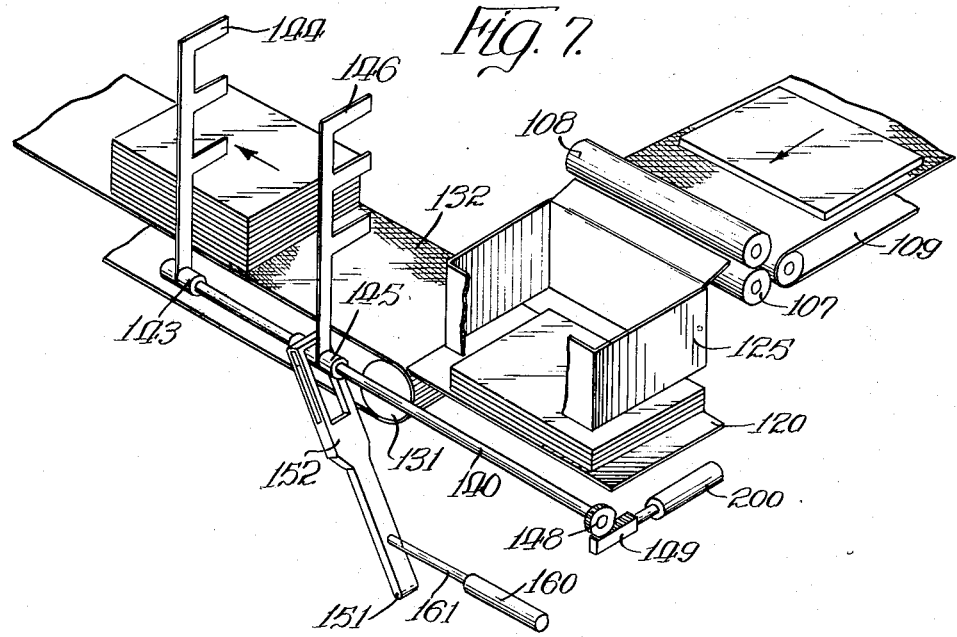
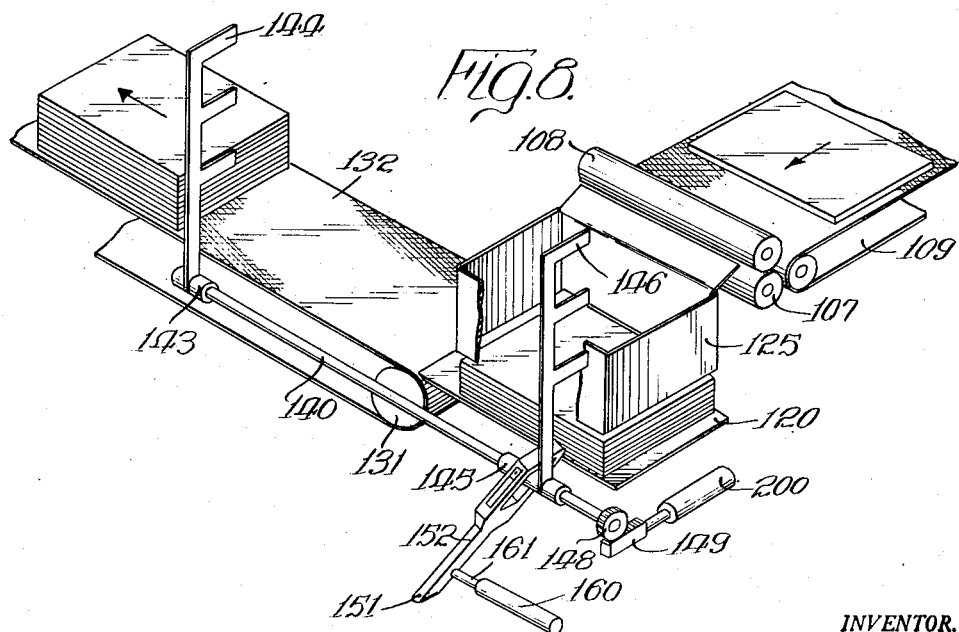
INVENTOR.
James H. Chandler
BY Thomas J. Graham
Atty.

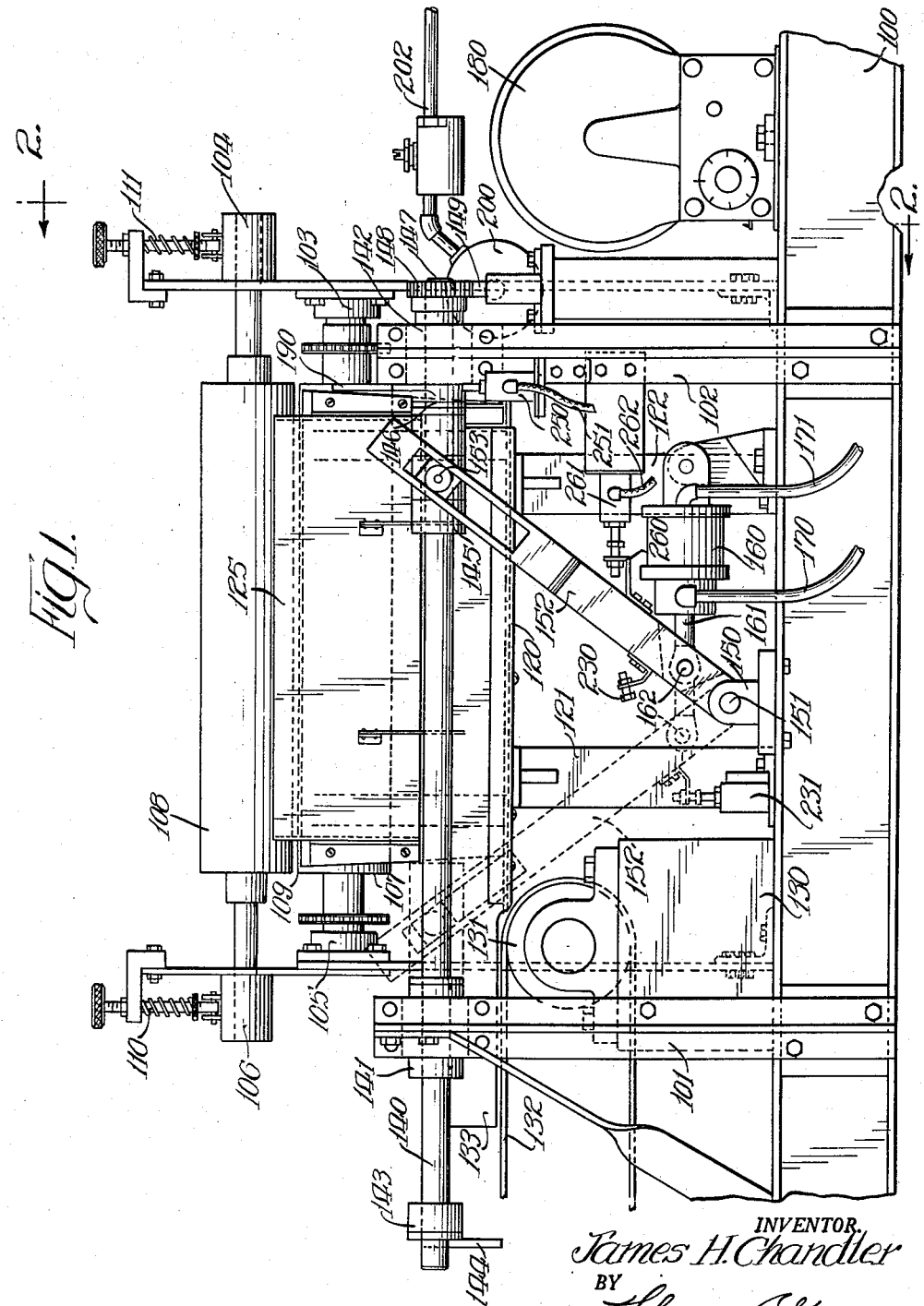

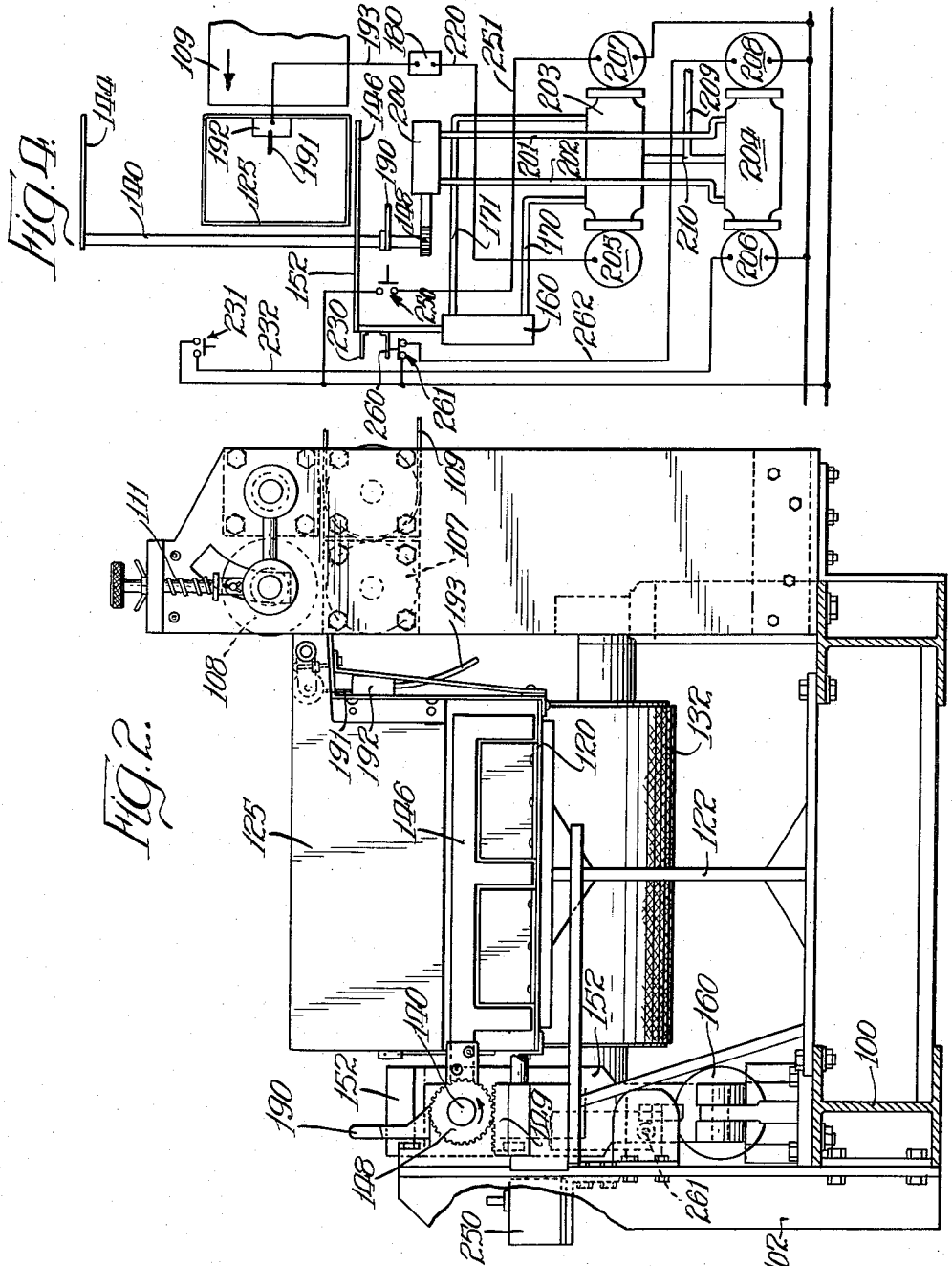

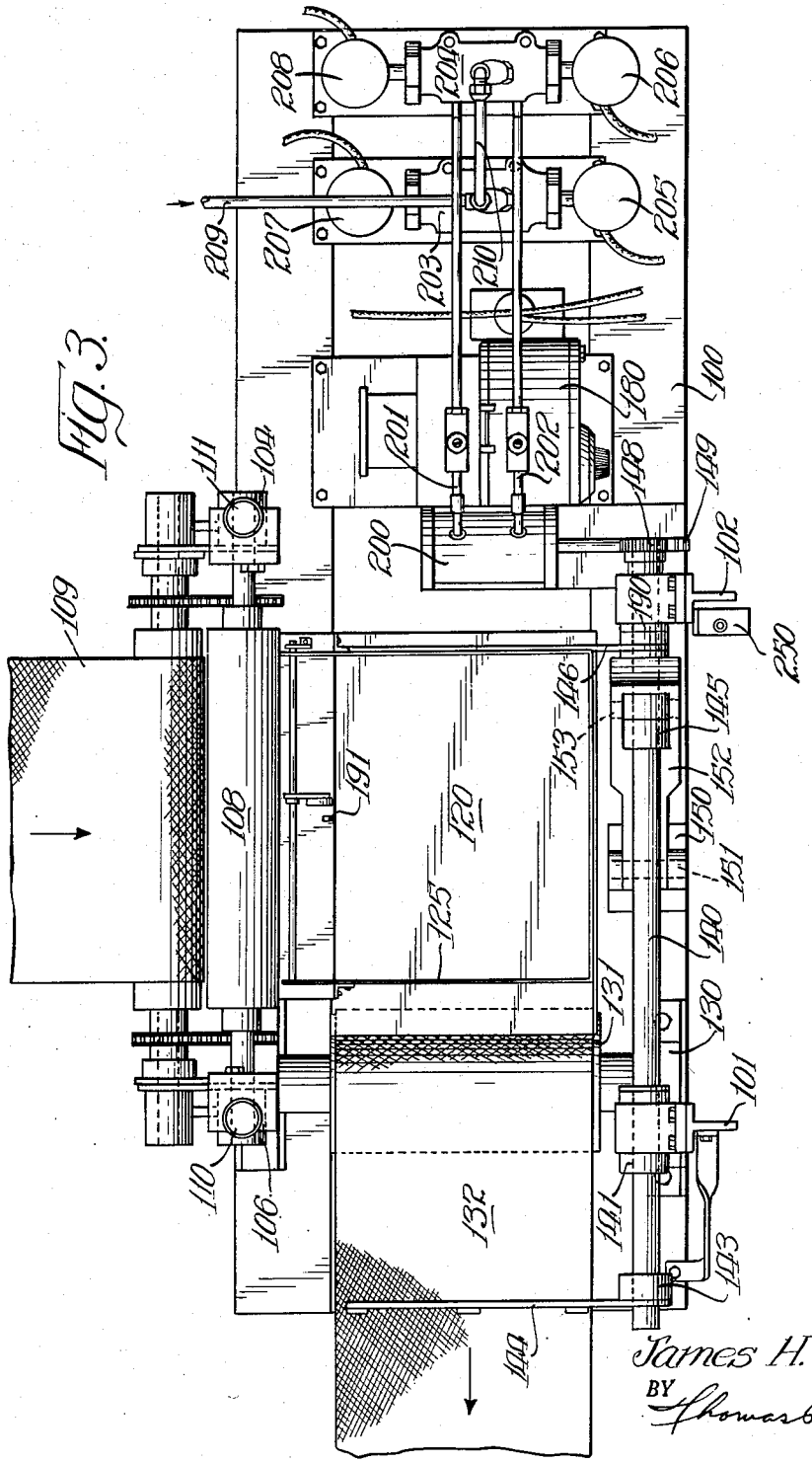

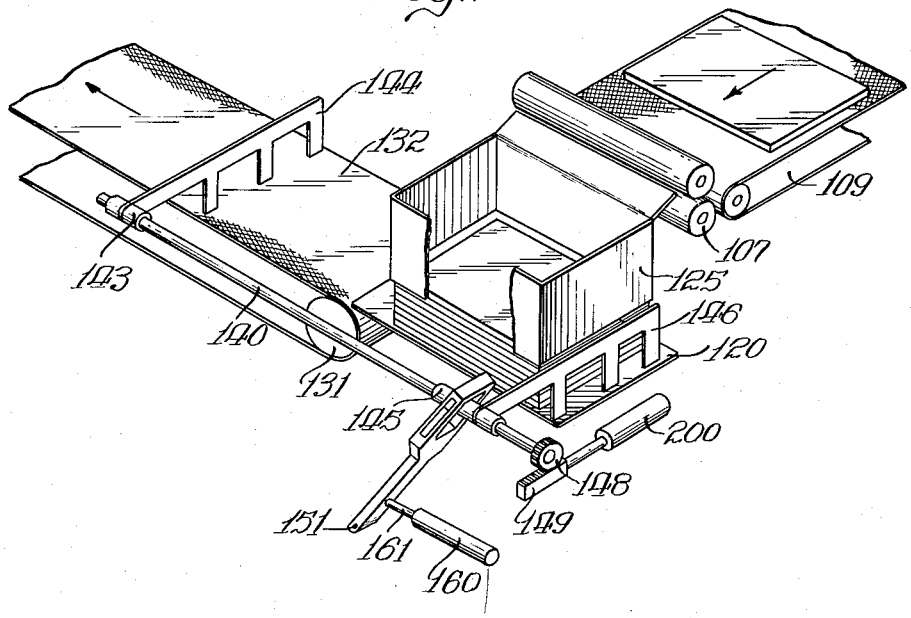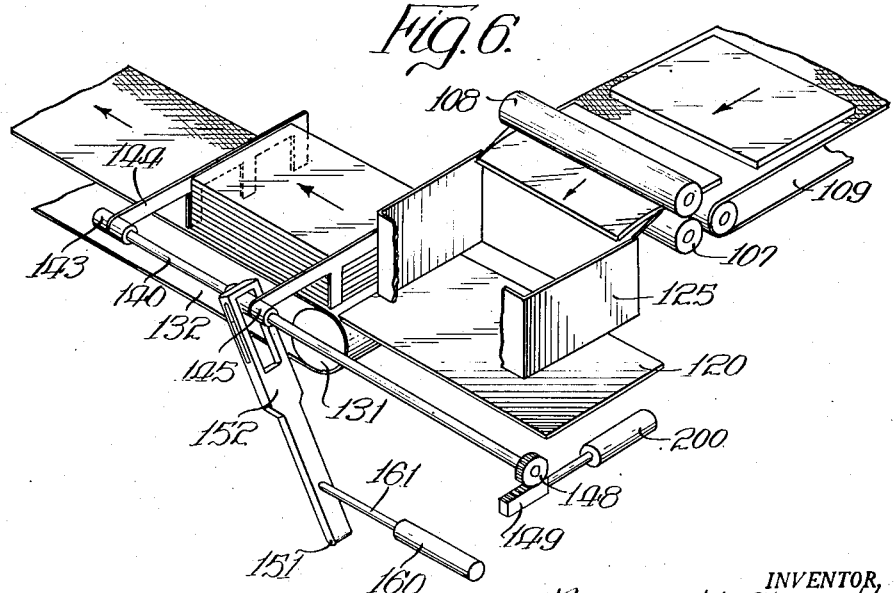

Patented Mar. 16, 1954

2,672,079

UNITED STATES PATENT OFFICE 2,672,079

ARTICLE HANDLING AND STACKING MACHINE

James H. Chandler, Steger, Ill.

Application February 25, 1950, Serial No. 146,278

13 Claims. (Cl. 93—93)

This invention relates to an article loading device, and, in particular, relates to a machine for handling planiform articles of uniform size, such as books, magazines or sections thereof and packages of materials, counting out a given number of said articles and separating them into groups or piles of the specified number.

In the printing industry, for example, it is standard practice for the finished articles, be they magazines, books or newspapers, to pass from the press onto a conveyor belt at uniform intervals. Counting devices are available with which, at uniformly spaced intervals, one article can be kicked out of line to indicate the number which have passed a given point. In any case, at the end of the conveyor where the articles are to be bundled for shipping, it has been necessary to have an attendant take them from the platform where they arrive, arrange them in piles of the required number, and lift the same onto another conveyor, or pass them on to another party for wrapping into bundles of a desired number.

Accordingly, it is a fundamental object of the instant invention to provide a device which will stack articles of uniform size accurately aligned to a specified number and pass those articles on to an attendant or conveyor while preserving the alignment for binding or wrapping into bundles for shipping purposes.

It is another object of the invention to provide a simple inexpensive device which can be adapted for installation on a standard press for receiving books or magazines, accepting specified numbers of those books or magazines in stacks and passing them on to a conveyor in those stacks ready for wrapping.

It is another object of the invention to provide a counting-stacking device for articles, such as books, magazines, newspapers or packages, which can be made from standard common parts and can be adapted for use with substantially any machine.

Other objects and advantages of the invention will in part be obvious and in part appear hereinafter from a consideration of the following detailed description.

Briefly, this device constitutes a machine for receiving the articles, counting out the specified number and setting up the operation of positioned synchronized arms, which will push the pile of material of desired size from the point of collection while retaining the articles in an accurately aligned pile, to a second point for distribution and reset for the reception of another collection of material. It involves, in its common embodiment therefore, a counting device, platform for receiving and holding the articles as they accumulate, rake arms, a rocking shaft to impart synchronous movement to said arms, and a fluid pressure or mechanically operated system for positioning and activating the said rake arms to move the material from the one point to the next. The invention, accordingly, comprises the features of construction, combinations of elements and arrangements of parts exemplified in the construction of the article handling machine hereinafter set forth.

Referring to the drawings accompanying the instant application for a detailed illustration of the machine, Figure 1 constitutes a front elevation of the apparatus;

Figure 2 is a side elevation of the apparatus, taken along the line identified as 2—2 in Figure 1;

Figure 3 is a top elevation of the apparatus showing the relationship of conveyors in a preferred embodiment of the machine;

Figure 4 is a semi-diagrammatic illustration of the electrical and fluid pressure operated circuits by which the several motions of the machine are initiated and carried out; and Figures 5, 6, 7 and 8 are perspective views showing a portion of the apparatus to illustrate the relationship of conveyors and article receiving box in a preferred embodiment of the machine, and to show the sequence of operations in receiving a specified number of articles and their movement out of the machine.

Referring now to Figure 1 wherein there is shown a general front elevation of the apparatus illustrating most of the parts of the apparatus, 100 represents a bed on which there is mounted a frame comprised of upright supports 101 and 102, which carry bearings 103, 104, 105 and 106. In turn, bearings 103 and 105 carry a roller 107 which is aligned with and one of a pair with 108. For adjusting the separation between rollers 107 and 108, bearings 104 and 106 are spring loaded by adjusters 110 and 111. Directly aligned with and substantially immediately under roller 107, which is the end roller of conveyor 109, there is platform 120 supported by arms 121 and 122, which platform is separated a distance determined by the size of the stack to be formed thereon from receiving box 125 placed directly in article catching and guiding relationship under the roller 108.

Also mounted on bed 100 is frame 130 carrying roller 131, the end roller of the conveyor 132, which is placed in article receiving relationship with the platform 120. Guide plate 133 is aligned with the longitudinal edge of the conveyor 132.

Between upright supports 101 and 102 is mounted rockable shaft 140 carried by bearings 141 and 142, which shaft is longitudinally aligned with the article catching platform 120. Substantially at one extremity, the shaft carries an additional bearing 143, which is fixed to the shaft and carries arm 144. At the opposite end of the shaft is a sliding bearing 145 on which arm 146 is carried (shown in Figure 2).

The bed of the machine, substantially at a central pivot point, carries a bearing 150 and pin 151 which serve as the pivot point for lever 152, which at its upper end is bifurcated to pass around the sliding bearing 145 on the shaft 140 and slotted normal to the bifurcation to receive pin 153 fixed to the bearing 145 to ride in the slot on the lever 152. The arrangement thus forms a lost motion joint so that when lever 152 is rotated about its pivot point 151, the bearing 145 will slide along shaft 140 to the opposite end thereof to be stopped substantially at support 101.

Shaft 140 is rotatable freely within the bearings 141, 142, 145, so that arm 146 may be rotated substantially 90° from a horizontal to a vertical position. To accomplish this rotation, rockable shaft 140 is extended through its bearing 142 where, on its extremity 147, it mounts the gear 148. A rack and pinion joint is formed by gear 148 engaging rack 149.

On the bed of the machine, there is mounted an air cylinder 160, though it should be understood that any fluid pressure operated cylinder, or other mechanical arrangement, could serve. The cylinder may be of conventional form and is a reciprocating type which has essentially an internal piston defining chambers on either side thereof, so that reciprocating motion can be imparted thereto by the application of fluid pressure to either side thereof. Externally, the cylinder has a shaft 161 which, in the structure shown, is attached to the lever 152 at a point 162 above its pivot point 151. The arrangement thus puts two pivot points, 151 and 162, on lever 152, point 151 being fixed and point 162 on the arm being laterally movable.

Tubes 170 and 171 represent air ducts admitting pressure to opposite sides of the piston so that reciprocal motion of the shaft 161 can be translated to rotary motion of the lever 152, movable in substantially an arc of about 90°, which in turn is translated to sliding motion of the bearing 145, carrying arm 146, on shaft 140.

Mounted also on the bed of the machine is counting device 180 which receives signals from its trigger properly placed in the line of travel of the articles passed, for example, over conveyor 109. The counting device may be of any conventional design and is preferably one which can be sensitized to a variety of counts, readily adjustable thereto, and which also can be activated by means of a small electrical switch in the line of articles coming from the machine.

Referring now to Figure 2 which is a side elevation of the apparatus and shows certain parts of the machine more clearly than Figure 1, it will be seen that articles in passing over conveyor 109 will be guided into receiving box 125, there to be dropped to platform 120 and passed out to the conveyor 132. Thus, in this embodiment of the apparatus, the receiving platform 120 is at a level below that of the first conveyor, where it can receive planiform articles aligned by box 125 and pass them on to another conveyor at the level of the platform. Appearing in this figure in end view is rake arm 146 shown in horizontal position and clearing through the space allowed between the receiving box 125 and platform 120.

Mounted on shaft 140 there is finger 199 which is in fixed relationship with the arm 146. The function of this structure will be apparent in the subsequent description of the operation of the apparatus.

Seen in end view in this figure is shaft 140 carrying gear 148 which meshes with rack 149 which is a part of a rack and pinion device for rotating the shaft 140.

Immediately under the delivery end of the conveyor 109, there is mounted trip finger 191 of micro-switch 192 which is connected (by line 193) to counter 180.

Referring to Figure 3, which is a top elevation of the apparatus and shows the parts in a typical preferred orientation in the handling apparatus, it will be seen that shaft 140 terminating in gear 148 meshing with rack 149 is driven by air cylinder 200 which (like cylinder 160) is of conventional construction and consists essentially of an internal piston dividing the cylinder into two chambers on opposite sides thereof, to which air pressure can be admitted to impart a reciprocating motion to the piston and shaft connected thereto. The air pressure is supplied to the cylinder 200 by lines 201 and 202 leading from four-way solenoid-controlled valve consisting of sections 203 and 204 and solenoids 205, 206, 207 and 208. The air supply to the valves is furnished by line 209 which leads to section 203 and to section 204, by branch line 210.

Referring to Figures 1 and 3 for the mechanical arrangement of the parts of the electromechanical system which activates the apparatus, it appears in Figure 1 that conduits 170 and 171 connect with cylinder 160 to supply it with the motivating air pressure. Cylinder 160 also serves to drive arm 152 which carries contact 230 which activates micro-switch 231, which in turn is electrically connected with the solenoids controlling section 204 of the control valve. Also, arm 152 carries contactor 60, which serves to activate micro-switch 261, and is connected by line 262 with section 204 of the control valve. Also appearing in Figure 1 is trip arm 190 mounted on shift 140 which serves to activate micro-switch 250 which is connected by line 251 to section 203 of the fluid control valve.

The mechanical relationship of the parts involving trip arm 190 and micro-switch 250 is better shown in Figure 2 as is also the placement of the micro-switch 191, 192.

The electro-mechanical activating and power system

For purposes of receiving a specified number of units from conveyor 109 to be deposited in receptacle 125, counted, and passed on to conveyor 132, a sequence of operations must be imparted to the arms 144 and 146, which sequence is initiated by the electrical counting system and carried out by the fluid pressure power system forming a part of the machine.

The remainder of the apparatus is best understood by reference to Figure 1 and the unified semi-diagrammatic layout of the system shown in Figure 4. Thus, 191 (Figure 4) represents the finger of a micro-switch 192 mounted in the path of articles passing from conveyor 109 to receptacle 125. Each activation of switch 192 passes an impulse by line 193 and is recorded at counting device 180. The intelligence thus imparted to the electro-pneumatic system when the specified number of units has passed over the switch serves to initiate operation of the system. For synchronized operation, the apparatus carries solenoids 205, 206, 207 and 208, of which 205 and 207 control the operations of section 203 of the fluid valve to activate cylinder 160, and solenoids 206 and 208 control section 204 to activate cylinder 200.

Air is a common fluid pressure medium, and any source of compressed air of adequate pressure will serve the purpose. It is to be understood, of course, that any hydraulic fluid can be used.

Conduit 209 connects from an air supply system through conduit 210 to section 203 and to section 204. The two sections of the four-way valve are respectively connected by conduits 170 and 171 to cylinder 160 and conduits 201 and 202 to cylinder 200.

For initating the appropriate sequence of operations in the fluid pressure operated system, micro-switches are provided to gather the intelligence determining the number of units which have passed to the conveyor, pass it to the counting unit, which in turn activates the separate cylinders through the operation of the solenoids.

Micro-switch 192 is tripped by each unit passing over conveyor 109 and passes this intelligence to counter 180. Counter 180 in turn is connected by line 220 to solenoid 205. Section 203 of the four-way valve is controlled by solenoids 205 and 207 and passes fluid pressure to cylinder 160 by lines 170 and 171.

In similar fashion, section 204 of the four-way valve connects fluid pressure to cylinder 200 by lines 201 and 202.

Sequential activation of the solenoids is obtained by electrical signals initiated by contact 230 on arm 152 which activates switch 231 which is connected to solenoid 206 by line 232.

Trip arm 190, maintained in fixed spaced relationship with arm 146, activates switch 250 which is connected by line 251 to solenoid 207.

Lever 152 on its return stroke (position shown in Figure 1) causes contact 260 to close micro-switch 261 connected by line 262 to solenoid 208.

*The operation of the device*

The operation of the apparatus is best understood by reference to Figures 5, 6, 7 and 8 in conjunction with Figure 4, which shows the electro-mechanical intelligence and power imparting portion of the apparatus related to the mechanical sections shown in Figures 5, 6, 7 and 8. The sequence of operations illustrated in the series of Figures 5, 6, 7 and 8 is shown with the first step in Figure 5 corresponding to that at which it might be said the tenth magazine is about to pass under roller 108 to be delivered to receptacle 125.

It will be seen that in this initial situation, arms 144 and 146 are in horizontal position with arm 146 substantially immediately adjacent to the accumulated pile of material to be moved. Upon completion of the last count, the magazine passing over roller 107 between rollers 107 and 108, passes onto the stack accumulated on the platform 120, thereby tripping the finger 191 of the micro-switch 192. The tenth activation of switch 192, assuming ten is the set number of times, energizes the counter unit 180 which in turn trips the first solenoid 205. Solenoid 205 thereupon opens the valve 203 allowing the flow of air pressure to take place through line 171 to operate air cylinder 160 on the forward stroke. Air cylinder 160, being connected by shaft 161 to lever 152, causes lever 152 to describe an arc of substantially 90° about its pivot point, thereby moving rake arm 146 and sweeping the pile of magazines from the platform 125 onto the conveyor 132 where they meet arm 144 and alignment of the stack is preserved. The position of the machine at this stage is shown in Figure 6.

Upon completion of its substantially 90° rotation, lever 152 causes contact point 230 to complete the circuit of micro-switch 231. Upon completion of this circuit, which corresponds substantially with the completion of the sweep of lever 152 and contact of the pile of magazines with arm 144, switch 231 energizes the second solenoid 206 which opens valve 204, allowing flow of fluid pressure through line 202 to operate cylinder 200 on its forward stroke.

It is understood, of course, that the machine is in a dynamic system and that the conveyors are moving at a rather high rate of speed as is common in the printing industry. In the forward stroke of 200, it rotates the shaft 140 substantially 90°, turning rake arms 144 and 146 into substantially vertical positions so that the pile of magazines which has been transferred to the moving conveyor clears stationary arm 144 and alignment is still preserved.

The position of the machine at this stage is shown in Figure 7.

Upon assumption of the vertical or substantially vertical position by arm 144 whereby the pile of magazines clears the arms, trip 190 on shaft 140 assumes essentially a horizontal position, for its relationship to arm 146 is one of substantial perpendicularity and it then makes contact with or closes the circuit of micro-switch 250. This switch then energizes the third solenoid 207 which opens valve section 203 causing the flow of air pressure to operate cylinder 160 for its return stroke, and in so doing, lever 152 is rotated back substantially 90° carrying rake arm 146 back to its starting position.

The position of the machine at this stage is shown in Figure 8.

Upon completion of this 90° rotation by arm 152, contact 260 carried thereby completes the circuit of micro-switch 261, which energizes the fourth solenoid 208, which opens valve section 204 permitting the flow of fluid pressure to operate the air cylinder 200 for its backward stroke, thereby rotating the shaft 140 90° and returning arms 144 and 146 to horizontal or starting position. The return of arms 144 and 146 from the vertical position to the horizontal position constitutes the completion of a cycle and the return of the arms to positions for operation.

The position of the machine at this stage is shown in Figure 5.

The sequence of operations is readily followed in Figures 5, 6, 7 and 8, in which Figure 5 represents the two arms in horizontal position with the apparatus in motion receiving magazines from the conveyor belt. Upon passage of the last magazines of the set count between the rollers, micro-switch 192 energizes the counter 180 and the sequence of operations is initiated.

In Figure 6, it will be seen that lever 152 has completed its 90° swing and has brought arm 146 past the receiving box 125 and moved the pile of magazines from the box so that the next count can commence accumulating. Having moved the magazines to a position away from the box, the third position of the apparatus is seen in Figure 7 where the arms have been rotated substantially 90° to permit the moving conveyor 132 to carry the pile of magazines away from the delivery point. To return the arms to article receiving position, lever 152 completes a return 90° pivot carrying rake arm 146 back to substantially its initial location, while in the meantime, magazines have accumulated in the receiving box. Upon completion of a rotation of shaft 140, arms 144 and 146 are rotated into horizontal position, and the apparatus is ready to commence a second cycle of operations to move the magazines out from the receiving box.

Thus, it will be seen that the machine described has general utility for receiving, counting and stacking planiform articles in preparation for packing and shipping. In the printing and bookbinding industry, where it finds its greatest application, the problem is reduced to performing the sequence of operations with considerable rapidity because of the rates of production, which will run several thousand per hour. In such an operation, books or magazines pass from one conveyor, drop on to the receiver, the proper number is accumulated, the sequence of operations initiated, the stack of books moved aside for wrapping, and the machine reset for moving another stack within the interval during which a stack of the required number must accumulate. It is possible with the apparatus described to reduce the time required for a given cycle of operation of the machine to only a few seconds, so that magazines or books being produced at a maximum rate can be handled.

For example, in normal operation of a magazine binder, the average speed will be approximately 12,000 units per hour, which means that if the counting and stacking machine is to prepare and count off stacks of ten, it must pass through its cycle of operations and reset to receive ten within 1/1200 hour (3 seconds). Within this cycle of 3 seconds then the counter must receive ten books, push them aside, rotate the arms out of place, return the arms to initial position and rotate them into position again for pushing the accumulated stack of ten. The intervals between the appearance of units on the platform reduce thus to about 0.3 second, or a shorter interval, so that the pusher arm 146, when it pushes the stack of books aside, must do so in a fraction of a second. It will be seen, therefore, that the push cycle which moves ten books or the required number of books off the platform, must be short enough to avoid the first unit of the next cycle of ten to follow. In this operation, therefore, the two arms are used because the pile of books is swept rapidly off the platform, halted momentarily to preserve the alignment of the stack, and then the two arms pulled out of the way to permit the stack of books to go on to the delivery conveyor for wrapping and bundling.

What is claimed is:

1. An article handling and stacking machine comprising, a receiver for articles, a rockable shaft in fixed spaced relationship with said receiver, a first reciprocable arm on said shaft and keyed thereto, a second arm fixed to said shaft, said arms being disposed on opposite sides of said receiver, means for cyclically imparting a reciprocating movement to said first arm to sweep accumulated articles from said received, and means for cyclically imparting a rotary movement to said shaft to move the arms from the line of travel of said articles.

2. An article handling and stacking machine comprising, a receiver, a rockable shaft held in fixed spaced relationship with said receiver, a reciprocable arm carried by said shaft, a second arm fixed to said shaft, means for cyclically imparting a reciprocating movement to said first arm to sweep it across said receiver and move articles therefrom to said second arm, and means for cyclically imparting a rotary movement to said shaft to move said first and second arms from the line of travel of said articles.

3. A machine for handling and stacking articles comprising, in combination, a receiver for the articles, a rockable shaft mounted adjacent to said receiver, a first reciprocable arm mounted on and carried by said shaft, a second arm fixed to said shaft, the arms being disposed on opposite sides of said receiver, means for reciprocating said first arm to sweep across said receiver, and means engaging said shaft to rock said shaft and rotate the arms carried thereby out of the line of travel of said articles.

4. A machine for handling and stacking planiform articles comprising in combination, a receiver for the articles, a rockable shaft mounted adjacent to said receiver, a first reciprocable arm mounted on and carried by said shaft, a second arm fixed to said shaft, said arms being disposed on opposite sides of said receiver, means comprising a lever pivoted at one end and engaging said first arm in a lost motion joint for reciprocating said arm, means for causing said lever to pivot, thereby to impart reciprocating motion to said arm and sweep it across said receiver to move articles accumulated thereon to the second arm, and means engaging said shaft to rock said shaft and rotate the arms carried thereby out of the line of travel of the articles.

5. An article handling and stacking machine for operation with planiform articles comprising, a receiver for the articles, a rockable shaft mounted adjacent to said receiver, a first reciprocable arm keyed to said shaft and carried thereby, a second arm keyed on said shaft in fixed lateral position, means comprising a lever pivoted at one end and forming a lost motion joint with said reciprocable arm for imparting a sliding motion thereto, means for causing said lever to pivot and means engaging said shaft to rotate said shaft and the arms carried thereby.

6. An article handling and stacking machine comprising, means for bringing articles to a receiver and dropping the articles on to said receiver, and a second means substantially aligned in level therewith for moving articles away from said receiver, a rockable shaft adjacent to said receiver, a first reciprocable arm carried by said shaft, reciprocating means comprising, a lever pivoted at one end and meeting said first arm in a lost motion joint, and motive means for said pivoted lever, a second arm fixed to said shaft, and motive means for said shaft synchronized with the motive means for said lever, whereby a sequence of operations involving a sweep of said first arm across said receiver, movement of both of said arms out of said original path, the return of said first arm to substantially its first position and return of both arms to substantially their original positions, can be initiated and carried out.

7. An article handling and stacking machine for moving articles from one place to a receiver to form stacks, and removing the stacks therefrom comprising, in combination, a receiver, a rockable shaft adjacent to said receiver, a first reciprocable arm carried by said shaft, a second arm fixed to said shaft, both arms being keyed to said shaft for rotation therewith, and reciprocating means for said first arm comprising a lever pivoted at one end and meeting said first arm in a lost motion joint, and motive means for said lever to impart a pivot motion thereto, motive means for said shaft comprising, a rack and pinion engaging said shaft, and synchronizing means for said several members, whereby said first reciprocable arm sweeps accumulated articles from said receiver, said shaft rotates to bring said arms out of alignment with said accumulated articles, said lever is caused to return said reciprocable arm to its starting position on said shaft, and said shaft is again rotated to put said arms in sweeping and article receiving position.

8. An article handling machine comprising, in combination, a first conveyor, a receiver, and a second conveyor in series, a rotatably mounted shaft adjacent to said receiver a first reciprocable arm carried by said shaft, reciprocating means comprising a lever pivoted at one end and meeting said first arm in a lost motion joint, a first motive means for said pivoted lever comprising a fluid pressure actuated cylinder, a second arm fixed to said shaft, a second motive means for said shaft comprising, a rack and pinion engaging said shaft, and a second fluid pressure actuated cylinder driving said rack and pinion, synchronizing means for said several arms and cylinders comprising a counter actuated by articles passing over said first conveyor to said receiver, a control valve controlling fluid pressure lines to said motive means, a first switch actuated by said counter at a predetermined count to actuate the valve and thereby the first cylinder to pivot said lever, thus to sweep said first arm across the receiver and move accumulated articles therefrom to said second conveyor at said second arm, a second switch actuated at the end of the pivot movement of said lever to actuate the control valve and admit pressure to the second cylinder, thereby to rotate said shaft and move the two arms out of the line of travel of the articles, a third switch actuated at the completion of the rotation of said shaft to actuate the control valve to admit pressure to said first cylinder to return the pivot lever to its starting position, and a fourth switch actuated upon completion of said pivot to admit pressure to said second cylinder and return said first and second arms to starting position for the succeeding cycle of operations.

9. An article handling machine comprising in combination a first conveyor, a receiver, and a station for receiving material from said machine, a rotatably mounted shaft adjacent to said receiver, a first reciprocable arm carried by said shaft, reciprocating means comprising a lever pivoted at one end and driving said first arm, a first motive means for said pivoted lever, a second arm fixed to said shaft, a second motive means for said shaft, synchronizing means for said several arms, comprising a counter actuated by articles passing over said first conveyor to said receiver, a control connected to said several motive means, a first means actuated by said counter at a predetermined count to actuate said control, and thereby said first motive means, thus to sweep said first arm across the receiver and move accumulated articles therefrom to said station, a second means actuated at the end of the pivot movement of said lever to actuate the control and said second motive means, thereby to rotate said shaft and move the two arms out of the line of travel of the articles, a third means actuated at the completion of the rotation of said shaft to acuate the control to return the pivoted lever to its starting position, and a fourth means actuated upon completion of said pivot to operate said second motive means and return said first and second arms to the starting position for the succeeding cycle of operations.

10. An article handling machine comprising means for bringing articles to a receiver and dropping the articles onto said receiver, and a station substantially aligned in level therewith for receiving articles from said receiver, a rockable shaft adjacent to said receiver, a first reciprocable arm carried by said shaft, reciprocating means for said arm, a second arm fixed to said shaft, and motive means for said shaft synchronized with the reciprocating means for said first arm, whereby a sequence of operations involving sweep of said first arm across said receiver, movement of both of said arms out of said original path, the return, of said first arm to substantially its first position, and rotation of both arms to substantially their original positions, is initiated and carried out.

11. An article handling machine comprising in combination a conveyor, a receiver, and a station for receiving material from said machine, a rotatably mounted shaft adjacent to said receiver, a first reciprocable arm carried by said shaft, reciprocating means for said first arm, a second arm fixed to said shaft, motive means for rotating said shaft, synchronizing means for said several arms including a control, said synchronizing means comprising a counter actuated by articles passing over said first conveyor to said receiver to actuate said control, and thereby to sweep said first arm across the receiver and move accumulated articles therefrom to said station at said second arm, a second control actuated at the end of the sweep of said first arm, thereby to rotate said shaft and move the two arms out of the line of travel of the articles, a third control actuated at the completion of the rotation of said shaft to return the first arm to its starting position, and a fourth control actuated upon return of said arm to return said first and second arms to starting position for the succeeding cycle of operations.

12. An article handling and stacking machine comprising means for bringing articles to a receiver and dropping the articles onto said receiver, and a station for receiving articles from said receiver, a rockable shaft adjacent to said receiver, a first reciprocable arm carried by said shaft, reciprocating means for said arm, a second arm fixed to said shaft at a point adjacent to said station, and motive means for said shaft synchronized with the reciprocating means for said first arm, whereby said first arm is first swept across said receiver, both of said arms are rotated out of said original path, said first arm is returned to substantially its first position, and both arms are rotated to substantially their original positions.

13. An article handling and stacking machine comprising a receiver for articles, a first arm mounted adjacent to said receiver as a starting point for reciprocating movement entirely across said receiver, a second arm mounted close to said receiver but spaced therefrom, means for cyclically reciprocating said first arm entirely across said receiver to a point a fixed distance from said second arm and back to its starting point, and connection between said arms to rotate said arms through substantially a 90° arc when said first arm reaches said fixed point and back to their initial positions when said first arm is returned to its starting point.

JAMES H. CHANDLER.

References Cited in the file of this patent

UNITED STATES PATENTS

| Number | Name | Date |
|---|---|---|
| 1,362,849 | Christensen | Dec. 21, 1920 |
| 1,558,691 | McDermott | Oct. 27, 1925 |
| 2,228,887 | Peterson | Jan. 14, 1941 |
| 2,325,889 | Thompson et al. | Aug. 3, 1943 |
| 2,424,093 | Harred | July 15, 1947 |
| 2,506,550 | Morrison | May 2, 1950 |
| 2,508,861 | Jessen | May 23, 1950 |